US010895766B2

(12) United States Patent
Kim et al.

(10) Patent No.: US 10,895,766 B2
(45) Date of Patent: Jan. 19, 2021

(54) DISPLAY DEVICE AND REPAIR METHOD THEREOF (71) Applicant: Samsung Display Co., Ltd., Yongin-Si (KR)

(72) Inventors: Sung Hoon Kim, Asan-si (KR); Young Jun Kwon, Cheonan-si (KR); Soo San Mun, Gwangju (KR); Dae Hyuk Song, Asan-si (KR); Cheol Su Jeong, Asan-si (KR)

(73) Assignee: Samsung Dispiay Co., Ltd.

( * ) Notice: Subject to any disclaimer, the term of this patent is extended or adjusted under 35 U.S.C. 154(b) by 0 days.

(21) Appl. No.: 16/583,156

(22) Filed: Sep. 25, 2019

(65) Prior Publication Data

US 2020/0271966 A1 Aug. 27, 2020

(30) Foreign Application Priority Data

Feb. 27, 2019 (KR) .................. 10-2019-0023326

(51) Int. Cl.
*G02F 1/13* (2006.01)
*G02F 1/1335* (2006.01)

(52) U.S. Cl.
CPC ...... *G02F 1/1309* (2013.01); *G02F 1/133528* (2013.01); *G02F 2201/508* (2013.01)

(58) Field of Classification Search
None
See application file for complete search history.

(56) References Cited

U.S. PATENT DOCUMENTS

| 2009/0141231 | A1* | 6/2009 | Lim | ..................... G02F 1/1309 349/192 |
| 2012/0002155 | A1* | 1/2012 | Lin | ................... G02F 1/136259 349/192 |
| 2012/0241919 | A1* | 9/2012 | Mitani | ............... H01L 21/6835 257/623 |
| 2015/0165560 | A1* | 6/2015 | Hackert | .............. B23K 26/382 428/43 |

(Continued)

FOREIGN PATENT DOCUMENTS

| KR | 10-0839031 B1 | 6/2008 |
| KR | 10-0891877 B1 | 4/2009 |

(Continued)

OTHER PUBLICATIONS

J. B. Lonzaga et al., "Color center formation in soda-lime glass with femtosecond laser pulses" Journal of Applied Physics, Oct. 1, 2003, pp. 4332-4340.

(Continued)

*Primary Examiner* — Ryan Crockett
(74) *Attorney, Agent, or Firm* — Innovation Counsel LLP (57) ABSTRACT

A display device may include the following elements: a first substrate; a first polarizer; a second substrate overlapping the first substrate and overlapping the first polarizer; and a polarization structure positioned inside the second substrate, comprising a first polarization layer, and comprising a second polarization layer. The first polarization layer may be narrower than the second substrate in a first direction and may be positioned farther from or closer to the first polarizer than the second polarization layer. The second polarization layer may be narrower than the second substrate in the first direction.

20 Claims, 9 Drawing Sheets (56) References Cited

U.S. PATENT DOCUMENTS

2018/0154572 A1* 6/2018 Richter ............... B29C 59/002
2019/0302568 A1* 10/2019 Albelo ................ G02F 1/292

FOREIGN PATENT DOCUMENTS

| KR | 10-0937848 | B1 | | 1/2010 |
|----|------------|----|----|--------|
| KR | 10-0985892 | B1 | | 10/2010 |
| KR | 10-2011-0096422 | | * | 8/2011 |
| KR | 10-2011-0096422 | A | | 8/2011 |
| KR | 10-1113230 | B1 | | 2/2012 |
| KR | 10-2017-0028943 | A | | 3/2017 |
| WO | WO 2020/109767 | A1 | * | 6/2020 |

OTHER PUBLICATIONS

D. Mangaiyarkarsai et al., "Large area multi-color changes induced by femtosecond laser pulses in soda-lime silicate glass embedded with Ag nanoparticles" Journal of Non-Crystalline Solids, Jul. 31, 2005, pp. 3156-3159.

Jianrong Qiu et al., "Femtosecond laser-induced microfeatures in glasses and their applications" Journal of Non-Crystalline Solids, Nov. 26, 2007, pp. 1100-1111.

O.M. Efimov et al., "Photoionization of silicate glasses exposed to IR femtosecond pulses" Journal of Non-Crystalline Solids, 1999, pp. 58-67.

O.M. Efimov et al., "Color-center generation in silicate glasses exposed to infrared femtosecond pulses" Optical Society of America, May 5, 1997, pp. 193-199.

J.T. Dickinson et al., "Color center formation in soda lime glass and NaCl single crystals with femtosecond laser pulses" Applied Physics A—Materials Science & Processing, Jul. 26, 2004, pp. 859-864.

Shimotsuma et al., "Self-Organized Nanogratings in Glass Irradiated by Ultrashort Light Pulses" American Physical Society, Dec. 12, 2003, 6 pages.

David Ashkenasi et al., "Picosecond laser-induced color centers in glass optics" Journal of Laser Applications, Mar. 17, 2011, 7 pages.

Jianrong Qiu, "Femtosecond Laser-induced Microstructures in Glasses and Applications in Micro-optics" The Chemical Record, Jan. 16, 2004, pp. 50-58.

V.R. Bhardwaj et al., "Optically produced arrays of planar nanostructures inside fused silica" Physical Review Letters, Feb. 10, 2006, 5 pages.

Martynas Beresna et al., "Radially polarized optical vortex converter created by femtosecond laser nanostructuring of glass" Applied Physics Letters, May 16, 2011, 4 pages.

Luis A. Fernandes et al., "Femtosecond laser fabrication of birefringent directional couplers as polarization beam splitters in fused silica" Optical Society of America, Jun. 6, 2011, 8 pages.

* cited by examiner

DISPLAY DEVICE AND REPAIR METHOD THEREOF

CROSS-REFERENCE TO RELATED APPLICATION

This application claims priority to and benefits of Korean Patent Application No. 10-2019-0023326 filed in the Korean Intellectual Property Office on Feb. 27, 2019; the entire contents of the Korean Patent Application are incorporated herein by reference.

BACKGROUND

(a) Field

The technical field relates to a display device and a repair method of the display device.

(b) Description of the Related Art

In a display device, a defective pixel may emit light or may display black regardless of the received scan signal and the received data signal. A light-emitting defective pixel may cause a conspicuous bright spot to a viewer, such that the quality of the display device may be unacceptable.

The above information disclosed in this Background section is for enhancement of understanding of the background of this application. This Background section may contain information that does not form the prior art that is already known in this country to a person of ordinary skill in the art.

SUMMARY

A defective bright spot pixel may be darkened by cutting a part of a wiring portion of the pixel using a laser or by carbonizing a color filter, an organic film, and the like constituting the display device.

For cutting the wire portion of the pixel, the laser may be directly irradiated to circuit wires. As a result, the laser may undesirably short-circuit wires adjacent to the wire portion, causing unwanted errors. The carbonizing method may damage neighboring regions and/or surrounding pixels, causing unwanted defects.

Embodiments may be related to a display device and a repair method of the display device. The method may darken a defective bright spot pixel without causing substantial damage to the display device or causing a significant light leakage. The method may involve forming a polarization region inside a substrate.

An embodiment provides a display device including: a lower substrate; an upper substrate facing the lower substrate; an upper polarizer disposed on the upper substrate; and a polarization region positioned in the upper substrate to transmit light that is polarized in a specific direction, wherein the polarization region includes polarization planes overlapping each other.

Each of the polarization planes may include polarization lines.

The polarization planes may include a first polarization plane, a second polarization plane, and a third polarization plane.

Polarization lines of the second polarization plane may be positioned between polarization lines of the first polarization plane in a plan view.

The polarization lines of the second polarization plane may be positioned between polarization lines of the third polarization plane in a plan view.

The polarization lines may include a nanostructure having a constant period.

A distance between the first polarization plane and the second polarization plane may be in a range of 5 µm to 50 µm.

A distance between the polarization lines included in a same polarization plane may be in a range of 3 µm to 20 µm.

A transmission polarization axis of the polarization region and a transmission polarization axis of the upper polarizer may be perpendicular to each other.

A distance between a polarization line of the first polarization plane and a polarization line of the second polarization plane which are adjacent to each other may be in a range of 1.5 µm to 10 µm in a plan view.

The display device according to the embodiment may further include: a liquid crystal layer disposed between the lower substrate and the upper substrate; and a color filter disposed between the lower substrate and the liquid crystal layer.

The display device according to the embodiment may further include: a backlight unit disposed below the lower substrate; and a lower polarizer disposed between the lower substrate and the backlight unit.

An embodiment provides a repair method of a display device, including: adjusting polarization of a laser beam; forming a first polarization plane by irradiating the laser beam into a substrate; and forming a second polarization plane above the first polarization plane.

The forming of the first polarization plane may be performed by repeatedly forming a polarization line by irradiating the laser beam in a first direction into the substrate.

The polarization lines may include a nanostructure, and the nanostructure may include a nano-ripple which has a crest extending in a direction perpendicular to a polarization direction of the laser beam.

The forming of the second polarization plane may be performed by repeatedly forming a polarization line by irradiating the laser beam in the first direction at a position a certain distance above the first polarization plane, and the polarization lines of the second polarization plane are positioned between the polarization lines of the first polarization plane in a plan view.

The repair method may further include forming a third polarization plane above the second polarization plane, the forming of the third polarization plane may be performed by repeatedly forming the polarization line by irradiating the laser beam in the first direction at a position a certain distance above the second polarization plane, and the polarization lines of the third polarization plane are positioned between the polarization lines of the second polarization plane in a plan view.

The adjusting of the polarization of the laser beam may be performed by rotating a half-wave plate by a predetermined angle.

The laser beam may be an ultra-short pulse laser beam having a pulse duration of picoseconds or femtoseconds.

The laser beam may have an infrared wavelength band.

An embodiment may be related to a display device. The display device may include the following elements: a first substrate; a first polarizer; a second substrate overlapping the first substrate and overlapping the first polarizer; and a polarization structure positioned inside the second substrate, comprising a first polarization layer, and comprising a second polarization layer. The first polarization layer may be narrower than the second substrate in a first direction and may be positioned farther from or closer to the first polarizer than the second polarization layer. The second polarization layer may be narrower than the second substrate in the first direction.

The first polarization layer may include polarization lines each having a lengthwise direction perpendicular to the first direction.

The polarization structure may include a third polarization layer. The third polarization layer may be narrower than the second substrate in the first direction. The second polarization layer may be positioned between the first polarization layer and the third polarization layer.

Each of the first polarization layer and the second polarization layer may include polarization lines, and the polarization lines of the second polarization layer may be positioned between the polarization lines of the first polarization layer in the first direction.

The polarization structure may include a third polarization layer. The second polarization layer may be positioned between the first polarization layer and the third polarization layer. The polarization lines of the second polarization layer may be positioned between polarization lines of the third polarization layer in the first direction.

The first polarization layer may include a polarization line. The polarization line may include first portions and second portions, which have lower density than the first portions, alternately positioned, and the first portions may be spaced from one another with a substantially constant pitch.

A distance between the first polarization layer and the second polarization layer may be in a range of 5 µm to 50 µm.

The first polarization layer may include two immediately neighboring polarization lines and may include no intervening polarization line between the two immediately neighboring polarization lines. A distance between the two immediately neighboring polarization lines may be in a range of 3 µm to 20 µm.

A transmission polarization axis of the polarization structure may be perpendicular to a transmission polarization axis of the first polarizer.

A distance between a polarization line of the first polarization layer and a polarization line of the second polarization layer in the first direction may be in a range of 1.5 µm to 10 µm. No intervening polarization line may be positioned between the polarization line of the first polarization layer and the polarization line of the second polarization layer.

The display device may include the following elements: a liquid crystal layer disposed between the first substrate and the second substrate; and a color filter disposed between the first substrate and the liquid crystal layer.

The display device may include the following elements: a backlight unit overlapping the first substrate; and a second polarizer disposed between the first substrate and the backlight unit.

An embodiment may be related to a method for repairing a display device. The method may include the following steps: setting a polarization direction of a laser beam; forming a first polarization layer by irradiating the laser beam into a substrate, wherein the first polarization layer is inside the substrate and is narrower than the substrate; and forming a second polarization layer above the first polarization layer, inside the substrate, and narrower than the substrate.

The forming of the first polarization layer may include forming polarization lines arranged in a first direction and each having a lengthwise direction perpendicular to the first direction. The laser beam may be moved in the lengthwise direction for forming each of the polarization lines.

The first polarization layer may include a polarization line. The polarization line may include first portions and second portions alternately positioned, and a density of the first portions may be higher than a density of the second portions. A extending direction of each of the high density regions and the low density regions may be perpendicular to the polarization direction of the laser beam.

Polarization lines of the second polarization layer may be positioned between polarization lines of the first polarization layer in a first direction. The first direction may be perpendicular to a lengthwise direction of each of the polarization lines of the second polarization layer.

The method may include forming a third polarization layer above the second polarization layer, inside the substrate, and narrower than the substrate after the forming of the second polarization layer. Polarization lines of the third polarization layer may be positioned between the polarization lines of the second polarization layer in the first direction.

The setting of the polarization direction of the laser beam may include rotating a half-wavelength phrase retarder plate by a predetermined angle.

The laser beam may be a pulse laser beam having a pulse duration of picoseconds or femtoseconds.

A wavelength of the laser beam may be in an infrared wavelength band.

In accordance with embodiments, the luminance of the defective bright spot pixels may be reduced to a certain level or less. Advantageously, satisfactory image display quality of the display device may be attained.

In accordance with embodiments, it is possible to efficiently block light generated from a defective bright spot pixel without causing unwanted light leakage or unwanted damage to the display device.

DETAILED DESCRIPTION

Example embodiments are described with reference to the accompanying drawings. The described embodiments may be modified in various different ways.

Like numerals may refer to similar constituent elements.

In the drawings, dimensions of layers, films, panels, regions, etc., may be exaggerated for clarity.

Although the terms "first," "second," etc. may be used to describe various elements, these elements, should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

When a first element is referred to as being "on" a second element, the first element can be directly on the second element, or one or more intervening elements may be present between the first element and the second element. When a first element is referred to as being "directly on" a second element, there are no intended intervening elements (except environmental elements such as air) present between the first element and the second element. The word "over" or "on" means positioning on or below the object portion, and does not necessarily mean positioning on the upper side of the object portion based on a gravity direction.

Unless explicitly described to the contrary, the word "comprise" and variations such as "comprises" or "comprising" may imply the inclusion of stated elements but not the exclusion of any other elements.

The term "polarization region" may mean "polarization structure." The term "polarization plane" may mean "polarization layer" or "polarization set." The term "period" may mean "pitch." The term "extending direction" may mean "lengthwise direction." The expression "between . . . in a plan view (or the display device)" may mean "between . . . in the first direction x."

Figure 1:
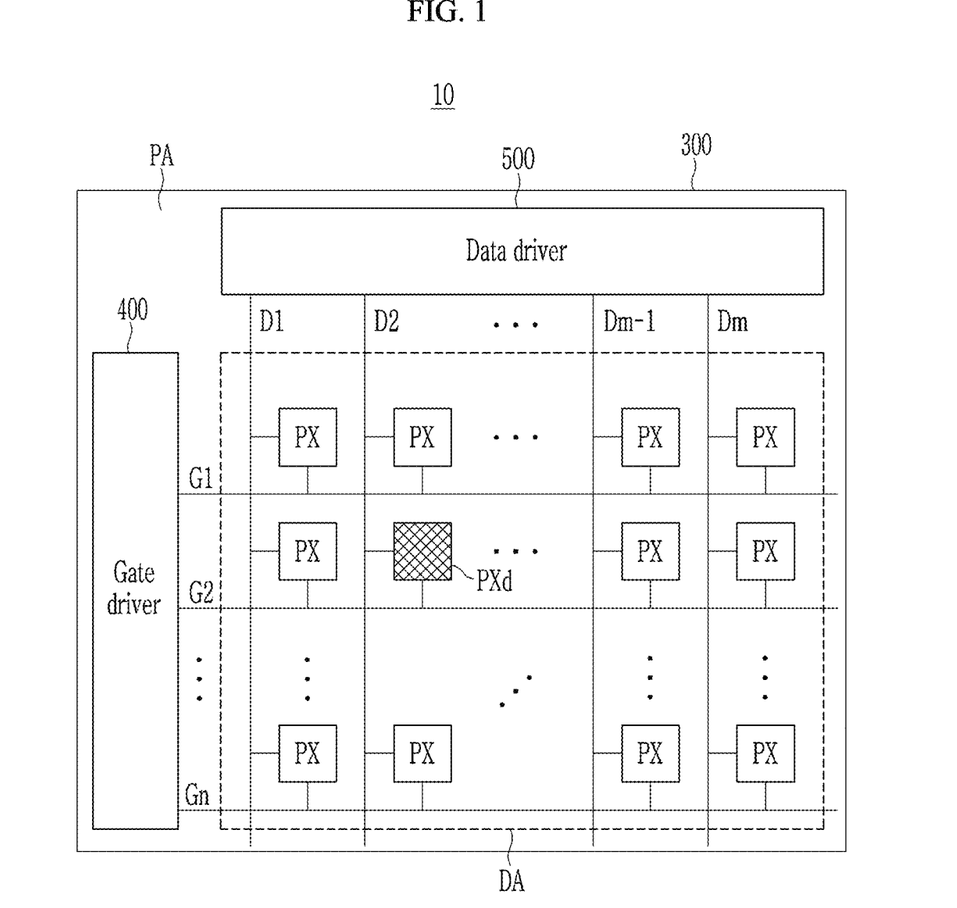
FIG. 1 illustrates a block diagram of a display device according to an embodiment.
Figure 2:
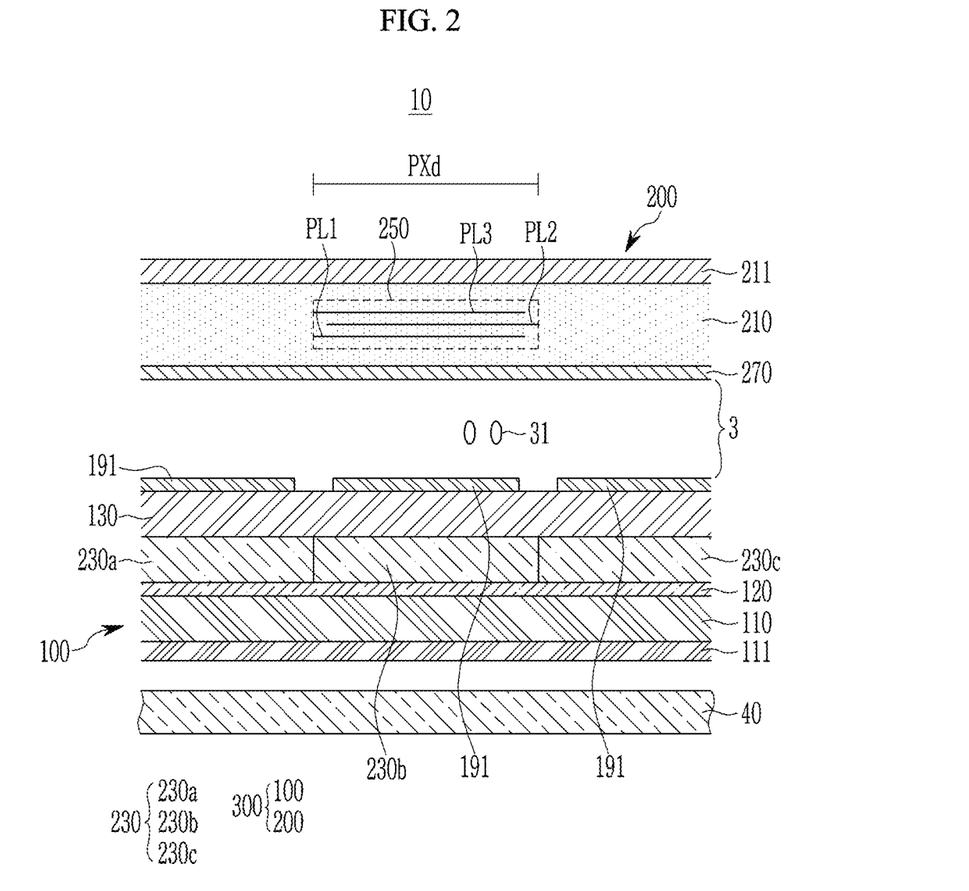
FIG. 2 illustrates a cross-sectional view of a display device according to an embodiment.
Figure 3:
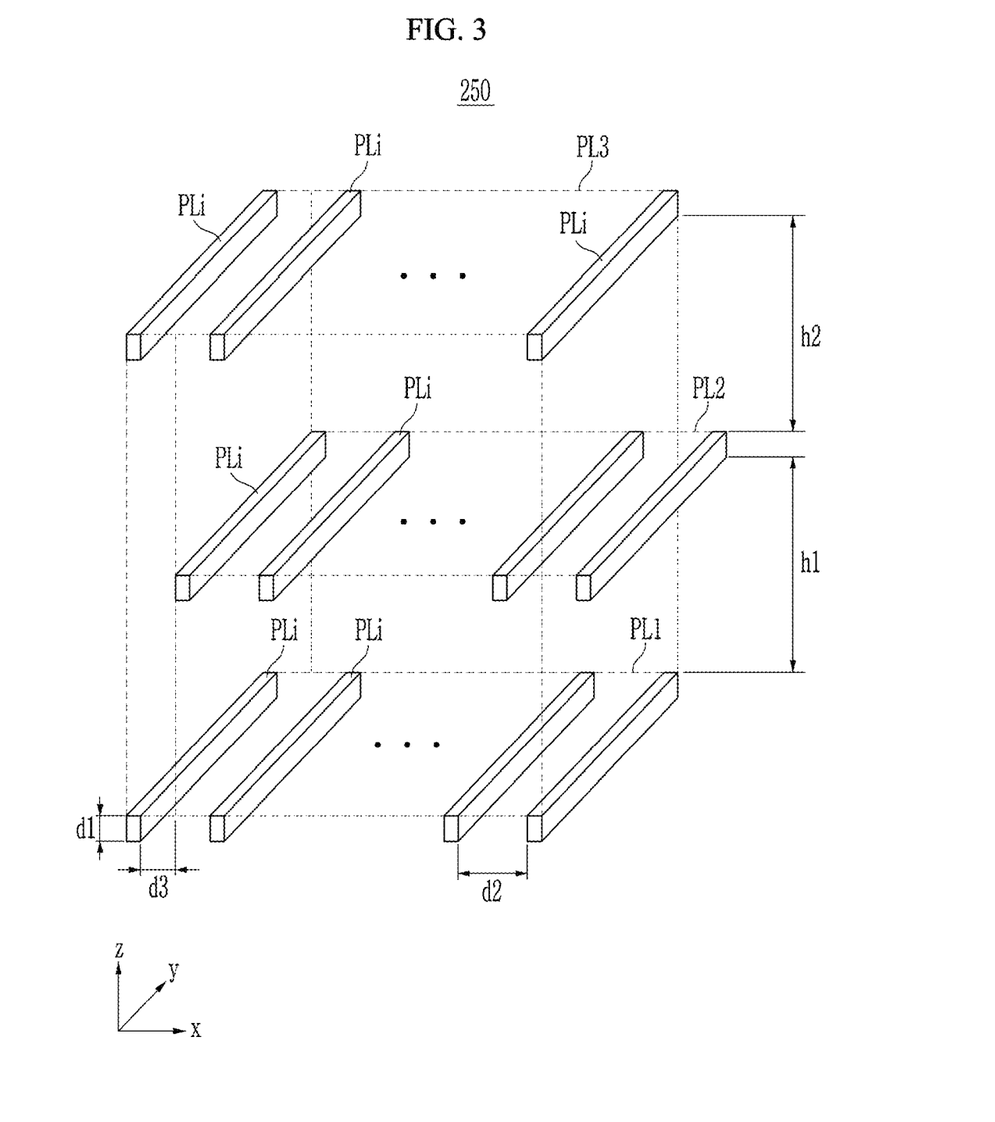
FIG. 3 illustrates a perspective view of a polarization region of FIG. 2 according to an embodiment.

FIG. 1 illustrates a block diagram of a display device 10 according to an embodiment. FIG. 2 illustrates a cross-sectional view of the display device 10 according to an embodiment. FIG. 3 illustrates a perspective view of a polarization region of FIG. 2 according to an embodiment.

The display device 10 may be one of a variety of display devices, such as a liquid crystal display (LCD) device and an organic light emitting diode display (OLED) device. FIG. 2 and FIG. 3 illustrate a liquid crystal display device as an example.

Referring to FIG. 1, the display device 10 includes a display panel 300 including a display area DA and a peripheral area PA.

The display area DA of the display panel 300 serves to display an image. A plurality of gate lines G1 and G2 to Gn, a plurality of data lines D1 and D2 to Dm−1 and Dm, and a plurality of pixels PX connected with the plurality of gate lines G1 to Gn and the plurality of data lines D1 to Dm are disposed in the display area DA. The gate lines G1 to Gn may transfer gate signals, and the data lines D1 to Dm may transfer data voltages. Each of the pixels PX indicates a minimum unit for displaying an image, and the display device displays an image using the pixels PX. Each pixel PX may include a switching element and a pixel electrode connected to one of the gate lines G1 to Gn and one of the data lines D1 to Dm. The switching element may be a three terminal element such as a thin film transistor integrated in the display panel 300. Each pixel PX may include a plurality of subpixels for improving lateral visibility.

The pixels PX of the display device may include a defective pixel PXd as well as normal driving pixels. The defective pixel PXd may be a defective bright spot pixel that may transmit a large amount of light regardless of a gate signal and a data voltage received by the defective pixel PXd.

The peripheral area PA is positioned in a circumference region of the display area DA, and elements or wires for generating or transferring various signals to be applied to the display area DA are disposed in the peripheral area PA.

A gate driver 400 is integrated in the peripheral area PA of the display panel 300 to sequentially transfer gate signals to the gate lines G1 to Gn. Each of the gate signals includes a gate-on voltage Von and a gate-off voltage Voff. The gate driver 400 receives a scan start signal for indicating start of output of a gate-on pulse, a gate clock signal for controlling output timing of the gate-on pulse, and the like in order to sequentially drive the gate lines G1 to Gn. Signal lines (not illustrated) for applying signals to the gate driver 400 may be disposed in the peripheral area PA of the display panel 300.

A data driver 500 is connected to the data lines D1 to Dm to transfer the data voltages. The data driver 500 may be directly mounted on the peripheral area PA of the display panel 300 or integrated into the peripheral area PA in a same manufacturing process as the switching device including the pixels PX, or may be disposed on a flexible printed circuit film attached to the display panel 300, unlike what is illustrated in FIG. 1.

The display panel 10 may include the display panel 300, the gate driver 400, the data driver 500, and a plurality of electrical elements such as a plurality of thin film transistors, a plurality of capacitors, and a plurality of diodes as various electrical constituent elements.

Referring to FIG. 2, the display device 10 includes a backlight unit 40, the display panel 300, and a liquid crystal layer 3. The display panel 300 includes an upper display panel 200 and a lower display panel 100.

The backlight unit 40 may be disposed on a rear surface of the display panel 300 to supply light to the display panel 300. The backlight unit 40 may include a light source, a light guide plate, a reflection plate, and an optical sheet, which are illustrated to be integrally formed in FIG. 2. Light generated from the light source of the backlight unit 40 is supplied to the upper display panel 300 through the light guide plate, the reflection plate, and the optical sheet.

A lower polarizer 111 is disposed in the lower display panel 100. The lower polarizer 111 may be disposed between the backlight unit 40 and a lower substrate 110 so as to transmit light (received from the backlight unit 40) in a specific direction. Light passing through the lower polarizer 111 may be substantially in the specific direction.

The lower substrate 110 is disposed on the lower polarizer 111. The lower substrate 110 may include transparent glass or plastic, and may be a flexible substrate.

A pixel circuit layer 120 is disposed on the lower substrate 110. The pixel circuit layer 120 is schematically illustrated. The pixel circuit layer 120 may include a thin film transistor, a gate conductive layer, and a data conductive layer, for driving the display device The gate conductive layer may include a gate electrode and a gate line. The data conductive layer may include a data line and further include a source electrode and a drain electrode that constitute a thin film transistor.

A thin film transistor disposed in the pixel circuit layer 120 may be turned on by receiving a gate signal from the gate line, and may receive a data voltage from the data line to apply it to a pixel electrode 191.

A color filter 230 is disposed on the pixel circuit layer 120. The color filter 230 may include a first color filter 230a, a second color filter 230b, and a third color filter 230c. The first color filter 230a, the second color filter 230b, and the third color filter 230c may be a red color filter, a green color filter, and a blue color filter, respectively. The first color filter 230a, the second color filter 230b, and the third color filter 230c transmit only red light, green light, and blue light, respectively. Accordingly, light having passed through the first color filter 230a, the second color filter 230b, and the third color filter 230c may be red light, green light, and blue light. In an embodiment, the color filter 230 may include magenta, yellow, and cyan color filters.

An organic film 130 is disposed on the color filter 230. The organic film 130 may include an acrylic resin or a siloxane resin. The organic film 130 may flatten an upper portion of the color filter 230, and may suppress contamination of the liquid crystal layer 3 caused by organic substances such as a solvent flowing into the liquid crystal layer 3 from the color filter 230, so as to prevent defects such as a residual image.

Pixel electrodes 191 may be disposed on the color filter 130. A pixel electrode 191 may be electrically connected to a thin film transistor disposed in the pixel circuit layer 120 through a contact hole (not illustrated) formed in the color filter 230 and the organic film 130.

The upper display panel 200 includes an upper polarizer 211. The upper polarizer 211 may transmit only light in a specific direction. Only light in the specific direction may pass through the upper polarizer 211.

An upper substrate 210 is disposed between the upper polarizer 211 and the lower polarizer 111. The upper substrate 210 may be transparent, and may include aluminum oxide ($Al_2O_3$) or silicon dioxide ($SiO_2$). The upper substrate 210 includes a polarization region 250 corresponding to the defective pixel PXd. The defective pixel PXd may be a defective bright spot pixel that may transmit a large amount of light regardless of a gate signal and a data voltage received by the defective pixel PXd. The polarization region 250 may reduce the luminance of the defective pixel PXd to a certain level or less in order to prevent the defective pixel PXd from being conspicuous. The light of the defective pixel PXd may hardly pass through the polarization region 250; the effect may be similar to a state where the pixel is turned off (i.e., off state). The polarization region 250 may exactly coincide with a region of the defective pixel PXd, or may be (slightly) larger than the region of the defective pixel PXd.

The polarization region 250 includes a plurality of polarization planes, and may include at least three polarization planes/layers/sets. That is, the polarization region 250 may include a first polarization plane PL1, a second polarization plane PL2, and a third polarization plane PL3. The first polarization plane PL1, the second polarization plane PL2 and the third polarization plane PL3 may overlap each other at a same region and may be staggered by a certain distance. In other words, some of edges of the adjacent polarization planes PL1, PL2, and PL3 may not overlap or coincide with each other. The polarization planes PL1 and PL2 may immediately neighbor each other (with no intervening polarization planes) and may partially overlap each other (without completely overlapping each other).

The combination of the polarization planes PL1, PL2, and PL3 may transmit light in one particular direction. A transmission polarization axis of the polarization region 250 and a transmission polarization axis of the upper polarizer 211 may be orthogonal. A transmission polarization axis indicates a polarization direction of light selectively passing through a polarizing element, such as polarizing plate or a polarizing region.

A common electrode 270 may be disposed below the upper substrate 210. The common electrode 270 may substantially continuously correspond to the display area DA of FIG. 1.

The liquid crystal layer 3 is disposed between the lower display panel 100 and the upper display panel 200. The liquid crystal layer 3 may be disposed between the pixel electrode 191 and the common electrode 270. The liquid crystal layer 3 may include liquid crystal molecules 31 having negative dielectric anisotropy. The liquid crystal molecules 31 may be oriented such that their long axes are generally perpendicular to or are inclined at a predetermined angle with respect to surfaces of the lower substrate 110 and the upper substrate 210 in the absence of an electric field in the liquid crystal layer 3. The liquid crystal molecules 31 may be pre-tilted depending on a fringe field or step between an edge of patterned portions (e.g., micro branches) of the pixel electrodes 191 and the common electrode 270.

A pixel electrode 191, to which the data voltage is applied, may generate an electric field together with the common electrode 270, to determine an orientation of corresponding liquid crystal molecules 31. The polarization direction of the light passing through the liquid crystal layer 3 may depend on orientations of liquid crystal molecules 31.

The transmission polarization axis of the upper polarizer 211 may be orthogonal to the transmission polarization axis of the lower polarizer 111.

Light emitted from the backlight unit 40 has polarization in various directions. Among the light, only light that has polarization in a direction parallel to the transmission polarization axis of the lower polarizer 111 may pass through the lower polarizer 111 and the liquid crystal layer 3.

The polarization direction of the light provided from the lower polarizer 111 may depend on an arrangement of the liquid crystal molecules 31. For example, liquid crystal molecules 31 may be tilted in a specific direction by the electric field generated by a pixel electrode 191 and the common electrode 270, and the polarization of the light passing through the corresponding portion of the liquid crystal layer 3 may be rotated by 90°. Accordingly, the polarization direction of the light passing through the liquid crystal layer 3 is perpendicular to the transmission polarization axis of the lower polarizer 111, and the light may subsequently pass through the upper polarizer 211. When liquid crystal molecules 31 have a different orientation, the polarization direction of the light provided from the lower polarizer 111 may not be changed by the liquid crystal layer 3. Accordingly, the light passing through the liquid crystal layer 3 cannot pass through the upper polarizer 211 since its polarization direction is perpendicular to the transmission polarization axis of the upper polarizer 211.

At the defective pixel PXd, the polarization of the light may be rotated by 90° by the liquid crystal layer 3 regardless of whether the pixel PXd is on or off according to one or more received signals. For example, the electric field generated between the pixel electrode 191 and the common electrode 270 may be maintained regardless of the signal of the gate driver or the data driver due to a defect in the conductive pattern, or the liquid crystal molecules 31 may be inclined in a specific direction due to the orientation(s) of the liquid crystal molecules 31 or a defect in the liquid crystal layer 3. If the polarization region 250 is not implemented, since the light passing through the liquid crystal layer 3 travels with the polarization being rotated by 90°, the light may pass through the upper polarizer 211 and may be undesirably visible to the user. In an embodiment, since the polarization region 250 (which has a transmission polarization axis perpendicular to that of the upper polarizer 211) corresponds to defective pixel PXd, the light from the defective pixel PXd may hardly pass through the polarization region 250, and the visible luminance of the defective pixel PXd is reduced to a certain level or less.

The display device 10 is illustrated as a normally black liquid crystal display of a vertical alignment (VA) mode in FIG. 2. In embodiments, the display device 10 may have one or more of a twisted nematic (TN) mode, an in-plane switching (IPS) mode, a fringe field switching (FFS) mode, an axially symmetric aligned micro-cell (ASM) mode, an optically compensated birefringence (OCB) mode, a ferroelectric liquid crystal (FLC) mode, and an anti-ferroelectric liquid crystal (AFLC) mode. The display device 10 may include liquid crystal molecules 31 having a positive dielectric constant instead of the negative dielectric constant.

FIG. 3 illustrates a perspective view of the polarization region 250 of FIG. 2 according to an embodiment.

Referring to FIG. 3, the polarization region 250 includes at least three polarization planes/layers/sets, including the first polarization plane PL1, the second polarization plane PL2, and the third polarization plane PL3. The first polarization plane PL1, the second polarization plane PL2, and the third polarization plane PL3 may overlap each other and may be disposed in parallel. The first polarization plane PL1, the second polarization plane PL2, and the third polarization plane PL3 may be spaced apart from each other at regular intervals.

A distance h1 between the first polarization plane PL1 and the second polarization plane PL2 and a distance h2 between the second polarization plane PL2 and the third polarization plane PL3 may be in a range of 5 µm to 50 µm. Each of the distances h1 and h2 between the polarization planes indicates a shortest distance between the polarization planes. When the distances h1 and h2 between the polarization planes exceeds 50 µm, a light leakage phenomenon may occur, and thus the darkening effect for the defective pixel PXd may not be sufficient.

A shortest distance between an edge of the first polarization plane PL1 and an edge of the second polarization plane PL2 in a first direction x may be in a range of 1.5 µm to 10 µm. Outermost edges of the first polarization plane PL1 and the second polarization plane PL2 extending in a second direction y may overlap or may not exactly overlap.

The first to third polarization planes PL1, PL2, and PL3 include a plurality of polarization lines PLi extending in the second direction y. The polarization lines PLi may be parallel to each other and spaced apart from each other. A distance d2 between immediately neighboring polarization lines PLi included in a same polarization plane may be in a range of 3 µm to 20 µm. When the distance d2 between the polarization lines PLi included in the same polarization plane is less than 3 µm, the polarization lines PLi (having a constant width) may overlap or may affect the adjacent polarization lines PLi; when the distance d2 between the polarization lines PLi included in the same polarization plane exceeds 20 µm, the light passes through the polarization lines PLi may exhibit an undesirable polarization characteristic, such that polarization cannot be effectively performed.

The polarization lines PLi included in the polarization planes PL1, PL2, and PL3 may have a predetermined depth/thickness d1. The polarization lines PLi may have a substantially cuboid shape. Polarization lines PLi may form a nanostructure having a constant period. A depth d1 of the polarization lines PLi may indicates a depth of the nanostructure.

In a plan view, polarization lines PLi of the second polarization plane PL2 may be positioned between polarization lines PLi of the first polarization plane PL1, and polarization lines PLi of the second polarization plane PL2 and polarization lines PLi of the first polarization plane PL1 may be alternately positioned. In a plan view, the distance d3 between a polarization line PLi of the second polarization plane PL2 and an immediately neighboring polarization line PLi of the first polarization plane PL1 may be in a range of 1.5 to 10 µm.

The polarization lines PLi of the first polarization plane PL1 and the polarization lines PLi of the third polarization plane PL3 may overlap each other. In a plan view, polarization lines PLi of the second polarization plane PL2 may be positioned between polarization lines PLi of the third polarization plane PL3. In a plan view, the distance d3 between a polarization line PLi of the second polarization plane PL2 and an immediately neighboring polarization line PLi of the third polarization plane PL3 may be in a range of 1.5 to 10 µm.

In an embodiment, the polarization lines PLi of the first polarization plane PL1 and the polarization lines PLi of the third polarization plane PL3 may not completely overlap each other, for more efficiently blocking light.

In an embodiment, the polarization region 250 may include only the first polarization plane PL1 and the second polarization plane PL2. In an embodiment, the polarization region 250 may include four or more polarization planes. In a plan view, the polarization lines PLi included in odd-numbered polarization planes and the polarization lines PLi included in even-numbered polarization planes may be alternately disposed, and polarization lines PLi of immediately adjacent polarization planes may not overlap each other.

Figure 4:
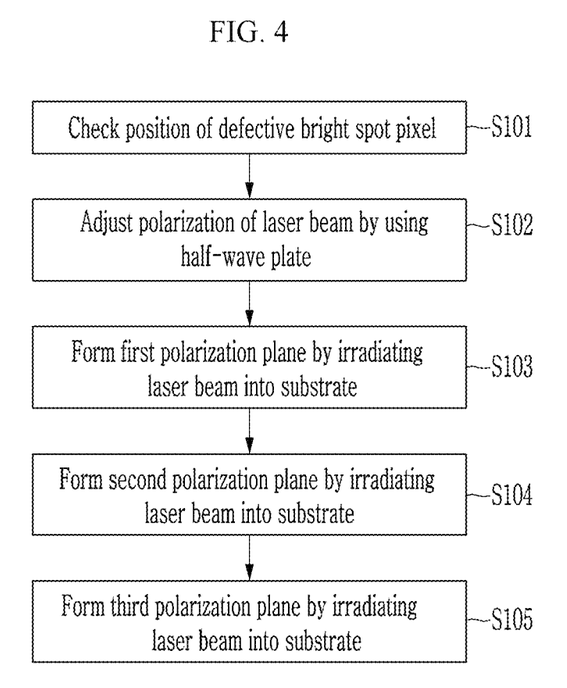
FIG. 4 illustrates a flowchart showing a repair method of a display device according to an embodiment.

FIG. 4 illustrates a flowchart showing a repair method of a display device according to an embodiment.

First, a position of a defective bright spot pixel is checked/determined (S101). A defective bright spot pixel may transmit a large amount of light regardless of a received gate signal and a received data voltage.

Next, polarization of a laser beam is adjusted by a half-wave plate (or half-wavelength phase retarder plate) (S102). When the laser beam generated by a light source passes through the half-wave plate rotated at a certain angle, a polarization direction of the laser beam is changed. Specifically, when the laser beam passes through the half-wave plate, a polarization axis of the laser beam rotates twice as much as an angle between the polarization axis of the laser beam and a fast axis of the half-wave plate before passing through the half-wave plate. For example, when an angle between the polarization axis of the laser beam and the fast axis of the half-wave plate is 45° before the laser beam passes through the half-wave plate, the polarization axis of the laser beam having passed through the half-wave plate rotates by 90°. Therefore, the polarization direction of the laser beam irradiated to the upper substrate may be adjusted by rotating the half-wave plate (disposed on a path of the laser beam) at a predetermined angle.

Next, the adjusted laser beam is irradiated into the upper substrate to form a first polarizing plane (S103). When the focal point of the laser beam is moved in one direction in the upper substrate, a polarization line is formed in a portion of the upper substrate processed by the focal point of the laser beam. A step of forming the first polarization plane may be performed by forming a plurality of polarization lines at a first constant height in the upper substrate.

Next, the laser beam is irradiated into the upper substrate to form a second polarizing plane (S104). In a step of forming the second polarization plane, a position of the focal point of the laser beam in the upper substrate is higher than the first polarization plane based on a lower surface of the upper substrate. The step of forming the second polarization plane may be performed by forming a plurality of polarization lines at a second constant height in the upper substrate. The polarization lines included in the second polarization plane may not overlap the polarization lines included in the first polarization plane.

Next, the laser beam is irradiated into the upper substrate to form a third polarizing plane (S105). In a step of forming the third polarization plane, a position of the focal point of the laser beam in the upper substrate is higher than the second polarization plane based on the lower surface of the upper substrate. The step of forming the third polarization plane may be performed by forming a plurality of polarization lines at a third constant height in the upper substrate. The polarization lines included in the third polarization plane may not overlap the polarization lines included in the second polarization plane. If the upper substrate includes only the first polarization plane and the second polarization plane, the step S105 of forming the third polarization plane may not be performed. If the polarization region 250 includes four or more polarization planes, the method may further include one or more step of forming one or more polarization planes after the step S105 of forming the third polarization plane.

Figure 5:
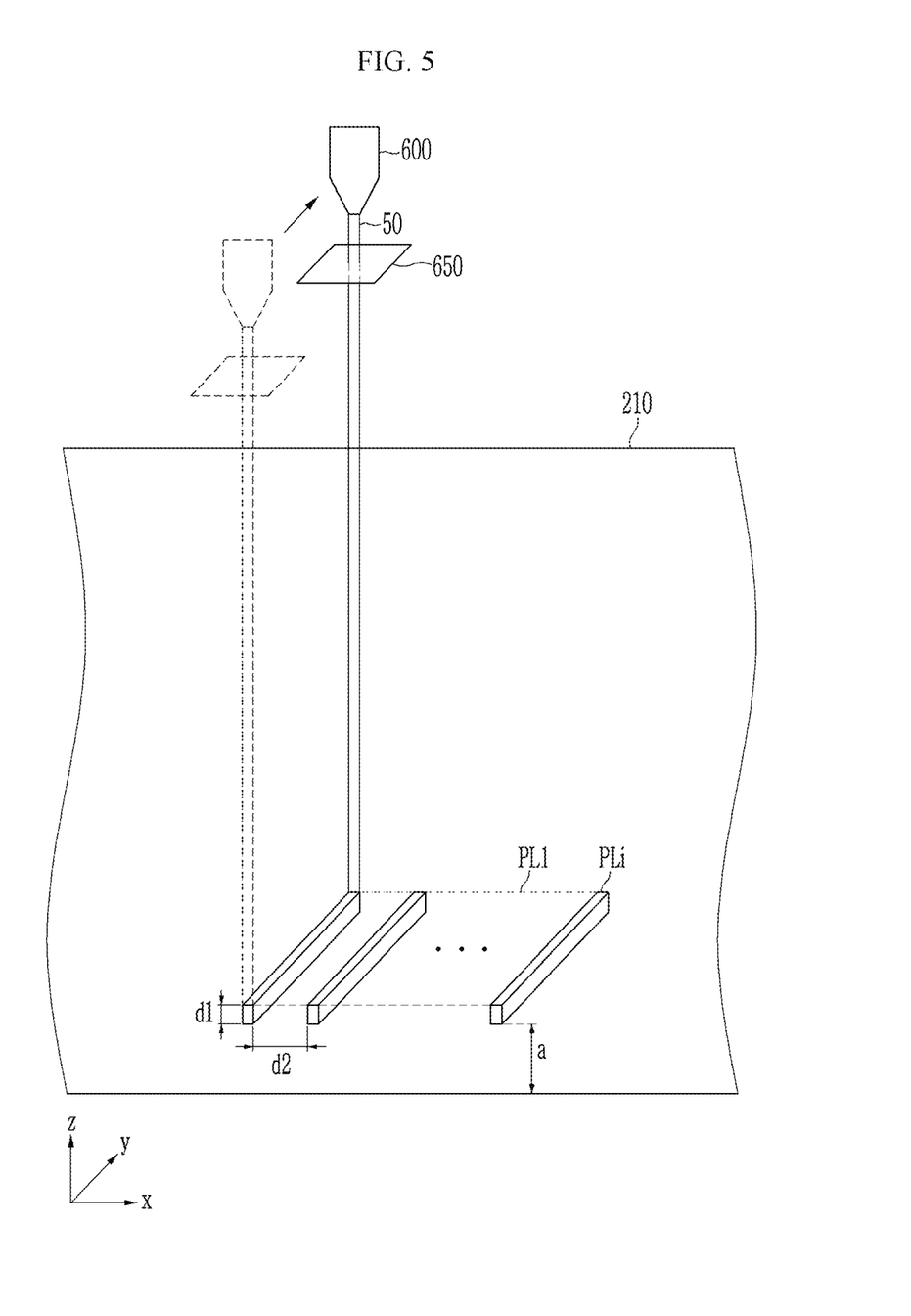
FIG. 5 illustrates a perspective view showing a step of forming a first polarization layer according to an embodiment.
Figure 6:
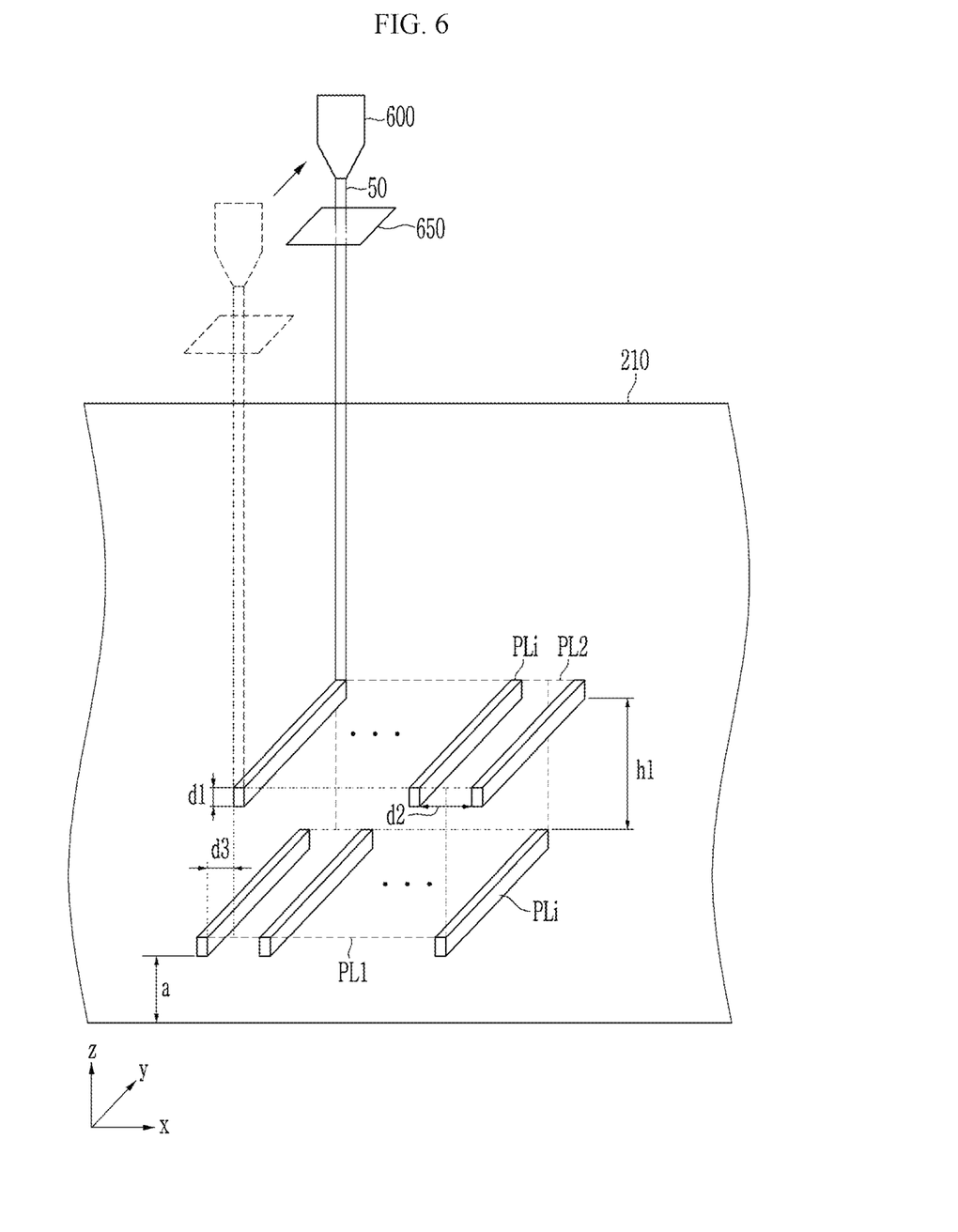
FIG. 6 illustrates a perspective view showing a step of forming a second polarization layer according to an embodiment.
Figure 7:
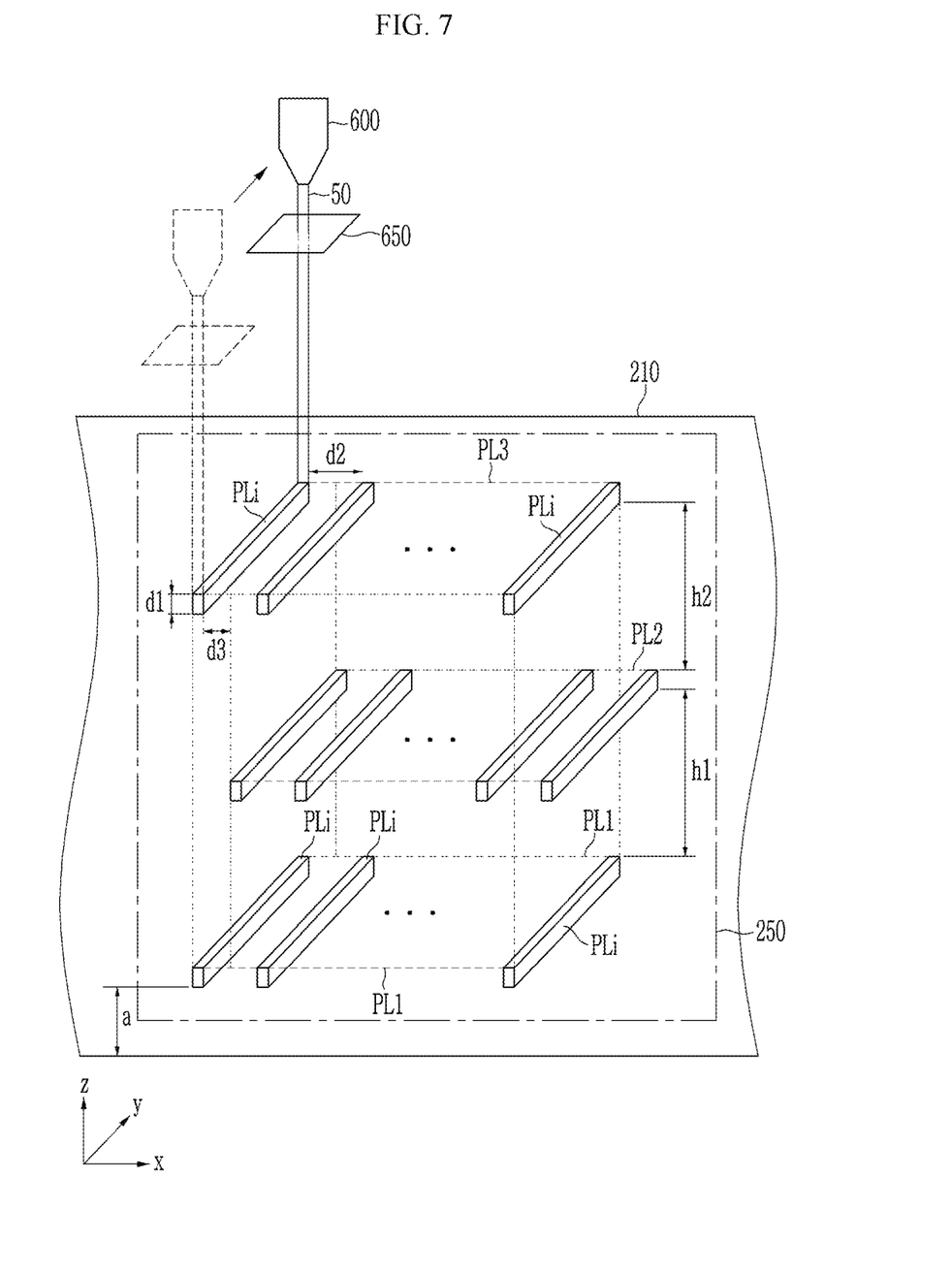
FIG. 7 illustrates a perspective view showing a step of forming a third polarization layer according to an embodiment.

FIG. 5 illustrates a perspective view showing a step of forming a first polarization plane PL1 according to an embodiment, FIG. 6 illustrates a perspective view showing a step of forming a second polarization plane PL2 according to an embodiment, and FIG. 7 illustrates a perspective view showing a step of forming a third polarization plane PL3 according to an embodiment.

Referring to FIG. 5, a light source 600 generates a laser beam 50. The laser beam 50 may be an ultra-short pulse laser with a pulse duration of picoseconds or femtoseconds. For example, the pulse duration of the laser beam 50 may be in a range of 190 to 290 fs (femtoseconds). In an embodiment, the pulse duration of the laser beam 50 may be 100 fs or less.

In general, as the pulse duration of the laser beam 50 is shorter, a nonlinear optical effect increases, which is advantageous for processing a glass substrate. The processing of the glass substrate may cause a change in a refractive index, generation of a color center (depending on a color change of the glass substrate), and/or generation of pores in the glass substrate. The ultra-short pulse laser may have a very high energy density, so as to process a target object formed of various materials without causing physical or chemical deformation of the target object.

The ultra-short pulsed laser can process materials with high heat transfer coefficients or low light absorptivity. The ultra-short pulsed laser can process a target object including two or more kinds of materials or a multi-layered composite target object in a single process. When/after the ultra-short pulsed laser is irradiated to glass substrate, a nanostructure having a desirable polarization characteristic may be formed.

The laser beam 50 may have an infrared wavelength band. For example, the wavelength band of the laser beam 50 may be in a range of 0.78 μm to 1000 μm. If an ultraviolet ray is irradiated to a substrate, photon energy may be excessively high and may be beyond a general band gap of a material constituting the substrate, which may cause a pore or a crack inside the substrate or may affect a portion of the substrate near the pore or the crack. In an embodiment, the laser beam 50 may have an infrared wavelength band, and the photon energy is relatively low, so that pores or cracks in the substrate may be minimized, and so that processing accuracy and processing quality may be optimized.

In general, when a material is exposed to light, photons with energy lower than a band gap of the material are not absorbed into the material. However, when a material is exposed to the ultra-short pulse laser, two or more photons are absorbed. Even when the photon energy of the ultra-short pulse laser is lower than a band gap of the material, the ultra-short pulse laser may be absorbed into the material. Even when the laser beam 50 has the infrared wavelength band, the ultra-short pulse laser may be absorbed into a material of a wide band gap.

A half-wave plate 650 is positioned on a path of the laser beam 50 generated by the light source 600. The half-wave plate 650 may be rotatable at one or more arbitrary or predetermined angles. The polarization direction of the laser beam 50 may be adjusted by rotating the half-wave plate 650 at a predetermined angle.

The polarization direction of the laser beam 50 is adjusted by the half-wave plate 650, and the adjusted laser beam 50 is irradiated to form a focal point in the upper substrate 210. The focal point of the laser beam 50 may be formed at a position that is separated by a predetermined height or more in the third direction z from a lower surface of the upper substrate 210. For example, a distance "a" from the lower surface of the upper substrate 210 to the focal point of the laser beam 50 may be 150 μm or more. When the focal point of the laser beam 50 is excessively close to the lower surface of the upper substrate 210, it may damage a circuit and the like disposed below the upper substrate 210.

The focal point of the laser beam 50 may move in the second direction y, and may leave a processing trace in the upper substrate 210. A polarization line PLi is formed in a processed region where the focal point of the laser beam 50 passes. The polarization line PLi may have a substantially constant depth d1, and may include a nano-structure having a substantially constant period (referring to FIG. 9).

After a first polarization line PLi is formed, a second polarization line PLi is formed by irradiating the laser beam 50 to a position that is separated by a certain distance in the first direction x from the first polarization line PLi and moving the laser beam 50 in the second direction y. A plurality of polarization lines PLi may be formed at a same height with respect to the lower surface of the upper substrate 210. The polarization lines PLi may be formed parallel to each other, and may be spaced apart from each other by a predetermined distance. A distance d2 between two immediately neighboring polarization lines PLi may be in a range of 3 μm to 20 μm. The distance "a" from the lower surface of the upper substrate 210 to the focal point of the laser beam 50 (or to top edges of the polarization lines PLi) in the third direction z may be 150 μm or more. The plurality of polarization lines PLi are formed at a same height and may constitute the first polarization plane PL1.

Referring to FIG. 6, the polarization direction of the laser beam 50 is adjusted by the half-wave plate 650, and the adjusted laser beam 50 is irradiated to form a focal point in the upper substrate 210. The polarization direction of the laser beam 50 used to form the first polarization plane PL1 may be the same as that of the laser beam 50 used to form the second polarization plane PL2.

The focal point of the laser beam 50 may be formed at a position that is separated by a predetermined height or more from the first polarization plane PL1. For example, a distance h1 from the first polarization plane PL1 to the focal point of the laser beam 50 may be in a range of 5 μm to 50 μm. If a distance h1 between the second polarization plane PL2 and the first polarization plane PL1 is less than 5 μm, nanostructures included in the polarization lines PLi of the second polarization plane PL2 and the first polarization plane PL1 may not be formed properly. If the distance h1 between the second polarization plane PL2 and the first polarization plane PL1 exceeds 50 μm, a light leaking phenomenon may occur.

The focal point of the laser beam 50 may move in the second direction y, and may leave a processing trace in the upper substrate 210. A polarization line PLi is formed in a processed region where the focal point of the laser beam 50 passes. The polarization line PLi may have a substantially constant depth d1 and may include a nano-structure having a substantially constant period.

The polarization lines PLi of the second polarization plane PL2 may not overlap the polarization line PLi of the first polarization plane PL1. The focal point of the laser beam 50 may be moved in the second direction y along a line between the polarization lines PLi of the first polarization plane PL1 in the first direction x at a certain distance from the first polarization plane PL1 in a third direction z.

After a first polarization line PLi of the second polarization plane PL2 is formed, a second polarization line PLi of the second polarization plane PL2 is formed by irradiating the laser beam 50 to a position that is separated by a certain distance in the first direction x from the first polarization line PLi and by moving the laser beam 50 in the second direction y. A plurality of polarization lines PLi may be formed at a same height with respect to the lower surface of the upper substrate 210. The polarization lines PLi may be formed parallel to each other, and two immediately neighboring polarization lines PLi may be spaced apart from each other by a predetermined distance d2. The distance d2 may be in a range of 3 to 20 μm.

In a plan view, polarization lines PLi of the second polarization plane PL2 may be positioned between polarization lines PLi of the first polarization plane PL1, and the polarization lines PLi of the first polarization plane PL1 and the polarization lines PLi of the second polarization plane PL2 may be alternately positioned. In a plan view, a distance between a polarization line PLi of the second polarization plane PL2 and an immediately neighboring polarization line PLi of the first polarization plane PL1 may be in a range of 1.5 μm to 10 μm.

Polarization lines PLi are formed at a same height with respect to the lower surface of the upper substrate 210 and may constitute the second polarization plane PL2.

Referring to FIG. 7, the polarization direction of the laser beam 50 is adjusted by the half-wave plate 650, and the adjusted laser beam 50 is irradiated to form a focal point in the upper substrate 210. The polarization direction of the laser beam 50 used to form the third polarization plane PL3 may be the same as that of the laser beam 50 used to form the second polarization plane PL2.

The focal point of the laser beam 50 may be formed at a position that is separated by a predetermined height or more from the second polarization plane PL2. For example, a distance h2 from the second polarization plane PL2 to the focal point of the laser beam 50 may be in a range of 5 μm to 50 μm.

The focal point of the laser beam 50 may move in the second direction y, and may leave a processing trace in the upper substrate 210. A polarization line PLi is formed in a processed region where the focal point of the laser beam 50 passes. The polarization line PLi may have a substantially constant depth d1 and may include a nano-structure having a substantially constant period.

The polarization lines PLi of the third polarization plane PL3 may not overlap the polarization line PLi of the second polarization plane PL2. The focal point of the laser beam 50 may be moved in the second direction y along a line between the polarization lines PLi of the second polarization plane PL2 in the first direction x at a certain distance from the second polarization plane PL2 in the third direction z.

After a first polarization line PLi of the third polarization plane PL3 is formed, a second polarization line PLi of the third polarization plane PL3 is formed by irradiating the laser beam 50 to a position that is separated by a certain distance in the first direction x from the first polarization line PLi and by moving the laser beam 50 in the second direction y. A plurality of polarization lines PLi may be formed at a same height with respect to the lower surface of the upper substrate 210. The polarization lines PLi may be formed parallel to each other, and two immediately neighboring polarization lines PLi may be spaced apart from each other by a predetermined distance d2. The distance d2 may be in a range of 3 to 20 μm.

In a plan view, polarization lines PLi of the third polarization plane PL3 may be positioned between polarization lines PLi of the second polarization plane PL2, and the polarization lines PLi of the second polarization plane PL2 and the polarization lines PLi of the third polarization plane PL3 may be alternately positioned. In a plan view, a distance between a polarization line PLi of the third polarization plane PL3 and an immediately neighboring polarization lines PLi of the second polarization plane PL2 may be in a range of 1.5 μm to 10 μm.

The polarization lines PLi of the third polarization plane PL3 and the polarization lines PLi of the first polarization plane PL1 may overlap each other. In an embodiment, the polarization lines PLi of the third polarization plane PL3 and the polarization lines PLi of the first polarization plane PL1 may not completely overlap each other.

Polarization lines PLi are formed at a same height and may constitute the third polarization plane PL3.

The polarization planes PL1, PL2, and PL3 may form the polarization region 250 having the desirable polarization characteristic, such that only light that has polarization in one particular direction may pass through the polarization region 250.

According to embodiments, since an ultra-short pulse laser beam having an infrared wavelength band is irradiated into the substrate for forming the polarization region 250, the luminance of defective bright spot pixels may be reduced to a certain level or less, and the laser beam would not cause additional damage to the display device. In embodiments, since light leakage may be prevented by overlapping polarization planes, the image display quality of the display device may be satisfactory.

In an embodiment, the position of the focal point of the laser beam 50 is shifted by moving the light source 600. In an embodiment, a galvanic mirror (not illustrated) may be used to shift the focal point position of the laser beam 50, or a stage that shifts the target object to be processed may be used.

Figure 8:
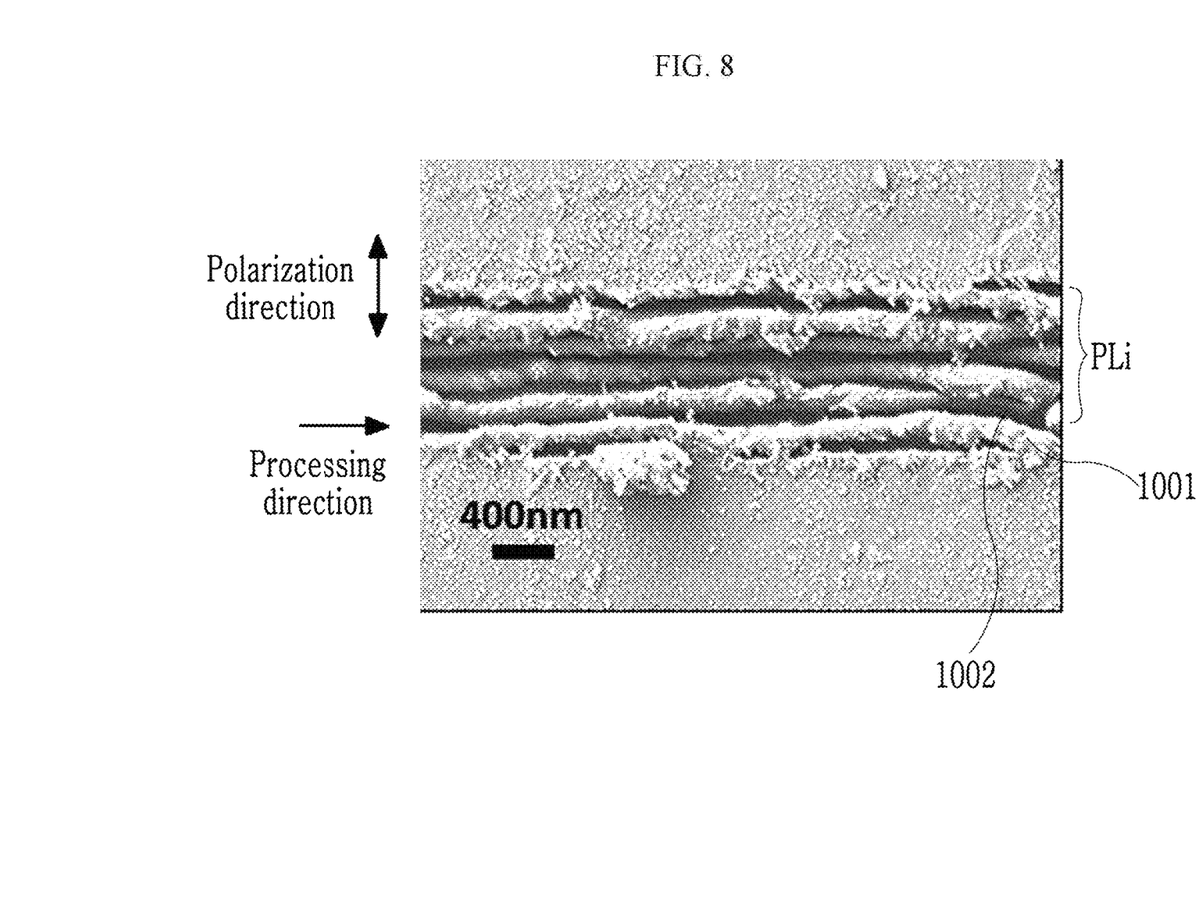
FIG. 8 illustrates an image of a polarization line according to an embodiment.

FIG. 8 illustrates a scanning electron microscope (SEM) image of a polarization line PLi formed on/in a substrate according to an embodiment. A laser beam with energy per pulse of 0.07 μJ was used, and the polarization direction of the laser beam irradiated to the substrate was adjusted to be perpendicular to the processing direction. Referring to FIG. 8, the polarization line PLi includes a nanostructure. The nanostructure may be a laser-induced periodic surface structure (LIPSS). The nanostructure may be a structure having a substantially constant period formed by irradiating an ultra-short pulse laser to a substrate. The nanostructure may include first portions 1001 and second portions 1002 alternately positioned with a constant period in a direction parallel to the polarization direction of the laser beam. A direction in which the first portions 1001 and the second portions 1002 extend may be perpendicular to the direction of polarization of the laser beam.

Figure 9:
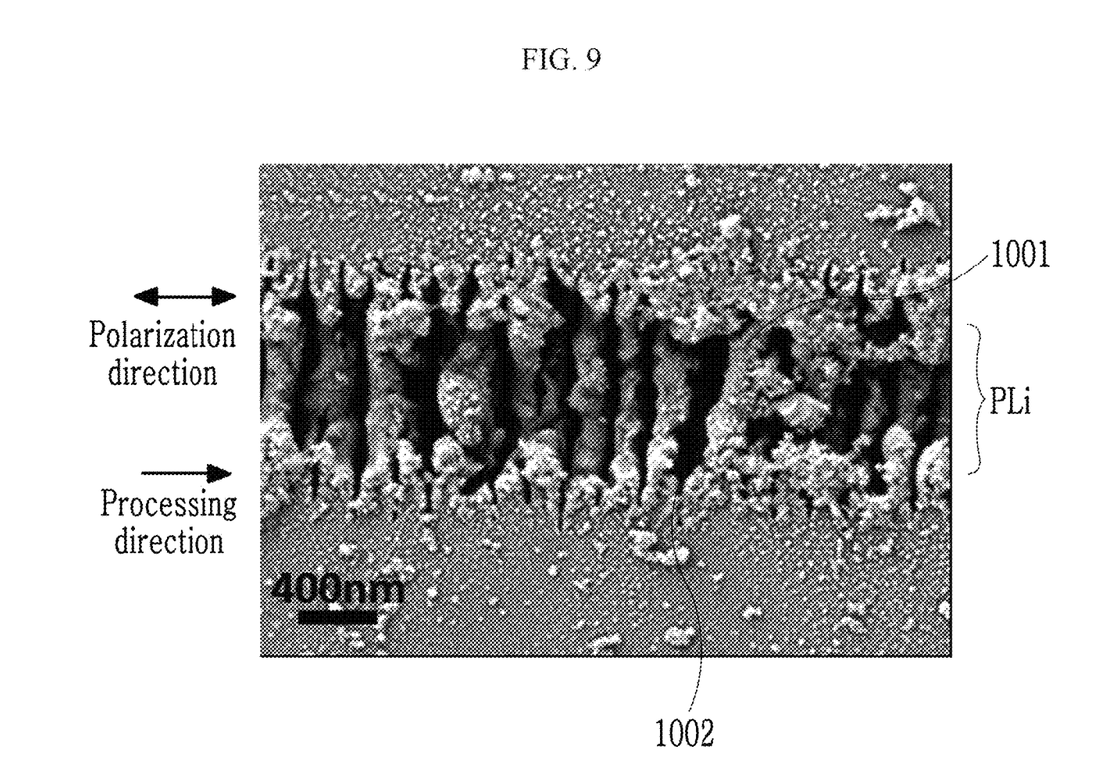
FIG. 9 illustrates an image of a polarization line according to an embodiment.

FIG. 9 illustrates scanning electron microscope (SEM) images of a polarization line PLi formed on/in a substrate according to an embodiment. A laser beam with energy per pulse of 0.07 μJ was used, and the polarization direction of the laser beam irradiated to the substrate was adjusted to be parallel to the processing direction. Referring to FIG. 9, the polarization line PLi includes a nanostructure. The nanostructure may be a laser-induced periodic surface structure (LIPSS). The nanostructure may be a structure having a substantially constant period formed by irradiating an ultra-short pulse laser to a substrate. The nanostructure may include first portions 1001 and second portions 1002 alternately positioned with a constant period in a direction parallel to the polarization direction of the laser beam. A direction in which the first portions 1001 and the second portions 1002 extend may be perpendicular to the direction of polarization of the laser beam.

Referring to FIG. 8 and FIG. 9, when the nanostructure of the polarization line PLi is on a surface of a substrate, the nanostructure may include ripples having the first portions 1001, which are crests/ridges/protrusions, and the second portions 1002, which are troughs.

Furthermore, when the nanostructure of the polarization line PLi is inside a substrate, the second portions 1002 may not be empty and may be regions with relatively low density. That is, the density of the first portions 1001 may be higher than the density of the second portions 1002, so that the nanostructure may have the first portions 1001 with higher density and the second portions 1002 with lower density alternately positioned in a direction parallel to the polarization direction of the laser beam. The nanostructure having a constant period may be formed by irradiating the ultra-short pulse laser into the substrate. When the ultra-short pulse laser is irradiated into the substrate, a physical change such as a density change or a refractive index change occurs inside the substrate.

The transmission polarization axis of the polarization region positioned in the substrate may depend on the extending direction of the first portions 1001 and the second portions 1002. Therefore, the polarization direction of the laser beam may be adjusted to suitably adjust the transmission polarization axis of the polarization plane(s) or the polarization region positioned in the substrate.

The period of the nanostructure may be in a range of a half of the wavelength of the laser beam to one third of the wavelength of the laser beam. The period may be in a range of 10 nm to 100 nm, for example. Since an optical characteristic of a particular region of the substrate is changed by a nanostructure having a nano-sized period, it is possible to pass only light that has polarization in one particular direction through a specific region of the substrate.

In an embodiment, the display device may be an organic light emitting diode display, and a plurality of polarization planes may be formed in an encapsulation layer that encapsulates an organic emission layer in the organic light emitting diode display. The polarization platens may reduce the luminance of bright spots to a certain level or less.

While example embodiments have been described, practical embodiments are not limited to the disclosed embodiments. Practical embodiments cover various modifications and equivalent arrangements within the scope of the appended claims.

What is claimed is:

1. A display device comprising:
a first substrate;
a first polarizer;
a second substrate overlapping the first substrate and overlapping the first polarizer; and
a polarization structure positioned inside the second substrate, and comprising a first polarization layer and a second polarization layer,
wherein the first polarization layer is narrower than the second substrate in a first direction and is positioned farther from or closer to the first polarizer than the second polarization layer, and
wherein the second polarization layer is narrower than the second substrate in the first direction.

2. The display device of claim 1, wherein
the first polarization layer includes polarization lines each having a lengthwise direction perpendicular to the first direction.

3. The display device of claim 1, wherein
the polarization structure further comprises a third polarization layer,
the third polarization layer is narrower than the second substrate in the first direction, and
the second polarization layer is positioned between the first polarization layer and the third polarization layer.

4. The display device of claim 1, wherein
each of the first polarization layer and the second polarization layer includes polarization lines, and
the polarization lines of the second polarization layer are positioned between the polarization lines of the first polarization layer in the first direction.

5. The display device of claim 4, wherein
the polarization structure further comprises a third polarization layer,
the second polarization layer is positioned between the first polarization layer and the third polarization layer, and
the polarization lines of the second polarization layer are positioned between polarization lines of the third polarization layer in the first direction.

6. The display device of claim 1, wherein
the first polarization layer comprises a polarization line, and
the polarization line includes first portions and second portions, which have lower density than the first portions, alternately positioned, the first portions spaced from one another with a substantially constant pitch.

7. The display device of claim 1, wherein
a distance between the first polarization layer and the second polarization layer is in a range of 5 μm to 50 μm.

8. The display device of claim 1, wherein
the first polarization layer comprises two immediately neighboring polarization lines and comprises no intervening polarization line between the two immediately neighboring polarization lines, and a distance between the two immediately neighboring polarization lines is in a range of 3 μm to 20 μm.

9. The display device of claim 1, wherein
a transmission polarization axis of the polarization structure is perpendicular to a transmission polarization axis of the first polarizer.

10. The display device of claim 1, wherein
a distance between a polarization line of the first polarization layer and a polarization line of the second polarization layer in the first direction is in a range of 1.5 μm to 10 μm, and
no intervening polarization line is positioned between the polarization line of the first polarization layer and the polarization line of the second polarization layer.

11. The display device of claim 1, further comprising:
a liquid crystal layer disposed between the first substrate and the second substrate; and
a color filter disposed between the first substrate and the liquid crystal layer.

12. The display device of claim 11, further comprising:
a backlight unit overlapping the first substrate; and
a second polarizer disposed between the first substrate and the backlight unit.

13. A method for repairing a display device, the method comprising:
setting a polarization direction of a laser beam;
forming a first polarization layer by irradiating the laser beam into a substrate, wherein the first polarization layer is inside the substrate and is narrower than the substrate; and
forming a second polarization layer above the first polarization layer, inside the substrate, and narrower than the substrate.

14. The method of claim 13, wherein
the forming of the first polarization layer comprises forming polarization lines arranged in a first direction and each having a lengthwise direction perpendicular to the first direction, and
the laser beam is moved in the lengthwise direction for forming each of the polarization lines.

15. The method of claim 13, wherein
the first polarization layer comprises a polarization line,
the polarization line includes first portions and second portions alternately positioned,
a density of the first portions is higher than a density of the second portions, and
an extending direction of each of the first portions and the second portions is perpendicular to the polarization direction of the laser beam.

16. The method of claim 13, wherein
polarization lines of the second polarization layer are positioned between polarization lines of the first polarization layer in a first direction, and
the first direction is perpendicular to a lengthwise direction of each of the polarization lines of the second polarization layer.

17. The method of claim 16, further comprising:
forming a third polarization layer above the second polarization layer, inside the substrate, and narrower than the substrate after the forming of the second polarization layer,
wherein polarization lines of the third polarization layer are positioned between the polarization lines of the second polarization layer in the first direction.

18. The method of claim 13, wherein
the setting of the polarization direction of the laser beam comprises rotating a half-wavelength phrase retarder plate by a predetermined angle.

19. The method of claim 18, wherein
the laser beam is a pulse laser beam having a pulse duration of picoseconds or femtoseconds.

20. The method of claim 19, wherein
a wavelength of the laser beam is in an infrared wavelength band.

* * * * *